United States Patent Office 3,354,096
Patented Nov. 21, 1967

3,354,096
PELLETED ZEOLITE COMPOSITIONS POSSESSING IMPROVED CRUSHING STRENGTH
Dean Arthur Young, Yorba Linda, Calif., assignor to Union Oil Company of California, Los Angeles, Calif., a corporation of California
No Drawing. Filed Apr. 6, 1965, Ser. No. 446,110
15 Claims. (Cl. 252—435)

This invention relates to new, mechanically stable, pelleted adsorbent and/or catalyst compositions comprising crystalline, alumino-silicate zeolites of the molecular sieve type. More particularly, this invention is directed to new mechanically stable, adsorbent pellets wherein crystalline zeolites are bound together through oxides of phosphorus. The invention is particularly concerned with catalysts based on type Y molecular sieve, which, by virtue of their high silica/alumina ratio, high surface area, relatively uniform pore diameters, are particularly useful as catalysts in cracking, hydrocracking and isomerization processes.

Briefly stated, the novel pellet compositions of this invention comprise phosphate-bonded, alumino-silicate, zeolite crystals wherein the zeolite has a $SiO_2/Al_2O_3$ mole-ratio between about 3 and 12. The adsorbents and/or catalysts are generally prepared by slurrying a mixture of zeolite crystals with a phosphorus oxide precursor, pelleting the mixture and calcining the pellets to form the bond. In the past, pellets have been prepared by mixing zeolites with binders such as activated alumina, clays and the like. However, it has been found that such pelleted compositions are inferior in crushing strength and mechanical stability, as compared to the phosphate-pelleted compositions of this invention. The novel compositions of this invention are found to exhibit excellent mechanical strength, and moreover this strength is substantially retained through long periods of use and severe reactivation treatments, in sharp distinction to previously known molecular sieve zeolite pellets.

Modern catalytic processes, notably petroleum refining and conversion processes, require pelleted catalysts in the size range of about 1/16-inch to 1/2-inch in diameter, which are not only specifically active in the chemical reactions involved, but also possess physical characteristics required for successful operation. Of outstanding importance are bulk density, hardness or crushing strength, and resistance to attrition. The ability of a catalyst pellet to retain its shape and size notwithstanding the mechanical handling to which it is subjected in shipment, the loading and unloading of reactors, and the use therein, is an important requirement for a successful catalyst. Any substantial crumbling or breaking of catalyst during loading of reactors, or crushing brought about by the mere weight of the catalyst bed, can cause serious difficulties. Firstly, the presence of unevenly distributed fine particles in the catalyst bed can cause uneven channeling of fluid reactants traveling through the reactor, resulting in uneven contacting and conversion, and the development of "hot spots" in localized zones. These "hot spots" can be disastrous in exothermic processes such as hydrocracking, both from the standpoint of catalyst deactivation, and the development of uncontrollable runways. Even where the fine particles are evenly distributed through the catalyst bed, other difficulties develop related to the pressure drop required to force the reactants through the reactor. It is the principal object of this invention to avoid the foregoing difficulties when using the specific molecular sieve zeolites of this invention.

The crystalline, siliceous zeolites for use in this invention are sometimes referred to in the art as molecular sieves, and are composed usually of silica, alumina and one or more exchangeable cations such as sodium, hydrogen, magnesium, calcium, etc. They are further characterized by crystal pores of relatively uniform diameter between about 4 and 14 A. It is preferred in a large number of catalytic processes to employ molecular sieve zeolites having a relatively high $SiO_2/Al_2O_3$ mole-ratio, between about 3.0 and 12, and even more preferably between about 4 and 8. Suitable zeolites found in nature include for example mordenite, stilbite, heulandite, ferrierite, dachiardite, chabazite, erionite, and faujasite. Suitable synthetic molecular sieve zeolites include for example those of the "A," "X," "Y" and "L" crystal types, or synthetic forms of the natural zeolites noted above, especially synthetic mordenite. The preferred zeolites are those having crystal pore diameters between about 8–12 A., wherein the average crystal size is less than about 10 microns along the major dimension. A prime example of a zeolite falling in this preferred group is the synthetic Y molecular sieve.

The naturally occurring molecular sieve zeolites are usually found in a sodium form, an alkaline earth metal form, or mixed forms. The synthetic molecular sieves normally are prepared first in the sodium form. In their sodium form, the general formula for the preferred Y molecular sieve zeolite of this invention is expressed as follows:

$$0.9 \pm 0.2\ Na_2O:Al_2O_3:WSiO_2:XH_2O$$

where $X=0$ to about 9, and $W=3$ to about 6.

For use as a cracking base, or in other acid-catalyzed reactions, it is preferred that most or all of the original zeolitic monovalent metal be ion-exchanged out with a polyvalent metal, or with an ammonium salt followed by heating to decompose the zeolitic ammonium ions, leaving in their place hydrogen ions and/or exchange sites which have actually been decationized by further removal of water:

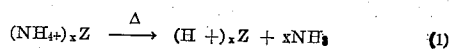

$$(NH_{4+})_xZ \xrightarrow{\Delta} (H+)_xZ + xNH_3 \quad (1)$$

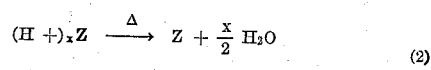

$$(H+)_xZ \xrightarrow{\Delta} Z + \frac{x}{2} H_2O \quad (2)$$

Mixed polyvalent metal-hydrogen zeolites may be prepared by ion-exchanging first with an ammonium salt, then partially back-exchanging with a polyvalent metal salt, and then calcining. In some cases, as in the case of synthetic mordenite, the hydrogen forms can be prepared by direct acid treatment of the alkali metal sieves. Hydrogen or "decationized" Y sieve zeolites of this nature are more particularly described in Belgian Patents Nos. 598,582, 598,682, 598,683, and 598,686, and U.S. Patent No. 3,130,006.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms are designated herein as being "metal-cation-deficient." The preferred catalyst compositions are those which are at least about 10%, and preferably at least 20%, metal-cation-deficient, based on the initial ion-exchange capacity. A specifically desirable and stable class of zeolites are those wherein at least about 20% of the ion-exchange capacity is satisfied by hydrogen ions, and at least about 10% by polyvalent metal ions such as magnesium, calcium, zinc, chromium, rare earth metals, etc.

In particular, the invention is applicable to mixed zeolitic forms of the crystalline zeolites wherein, for example, most of the sodium is first replaced with ammonium ions, and then the resulting ammonium zeolite is back-exchanged with other metal salt solutions, preferably polyvalent metal salts such as magnesium, zinc, calcium or rare earth metal salts, to prepare a mixed metal-ammonium zeolite which may then be calcined to form a mixed hydrogen-polyvalent metal zeolite.

In order that the foregoing zeolites may be used as hydrocracking or isomerization catalysts, they must be activated by incorporating a minor proportion of a suitable metal hydrogenating component, normally a Group VIB and/or Group VIII metal. The preferred hydrogenating metals comprise the Group VIII noble metals, and particularly palladium, platinum or rhodium. Other specific promoters which may be employed include e.g., tungsten, molybdenum, chromium, manganese, etc.

The amount of hydrogenating metal in the catalyst can vary within wide ranges. Broadly speaking, any amount between about 0.1% to about 20% by weight may be used. In the case of the noble metals, it is normally preferred to use about 0.2% to 2% by weight. The preferred method of adding the hydrogenating metal is by ion-exchange. This is accomplished by digesting the zeolite, preferably in its ammonium form, with an aqueous solution of a suitable compound of the desired metal wherein the metal is present in a cationic form, as described for example in Belgian Patent No. 598,686. The metal-ammonium zeolite may then be subjected to final calcining and activation in order to convert the remaining ammonium ions to hydrogen ions.

It has now been discovered that pelleted compositions comprising at least one of the foregoing crystalline, alumino-silicate zeolites and a phosphorus oxide binder possess superior qualities of mechanical strength and stability, as compared to similar composites of the zeolites with conventional binders such as alumina. It is within the contemplated scope of this invention that the binder be derived from a phosphorus oxide precursor selected from the group consisting of phosphoric acid, ammonium salts of phosphoric acid, and mixed hydrogen and/or ammonium phosphates of weakly basic polyvalent metal cations having an ionic radius of less than 1.0 angstrom. Specifically, it is contemplated that the phosphate-bonding be obtained by heating or calcining a copelleted mixture of the crystalline, alumino-silicate zeolite and one or more of the phosphorus oxide binder precursors, with resultant elimination of water and formation of Al-O-P and/or Si-O-P linkages at exterior surface areas of the zeolite crystals, thus providing a mechanically stable pellet wherein the zeolite crystals are bound together by interconnecting phosphate linkages. While any proportion of added phosphate binder advantageously increases the mechanical strength, the binder should normally comprise from about 1% to about 50% by weight of the pelleted mixture, and preferably from about 3% to about 40%.

According to a preferred embodiment of the invention, excess alumina is added to the composition. In this modification, the zeolite may be slurried or mulled in an aqueous alumina suspension or paste, to which is added the desired proportion of mono- or dihydrogen ammonium phosphate, or phosphoric acid. The resulting wet mixture is later dried, pelleted, and calcined to decompose the ammonium ions in the alumina-phosphate mixture as well as dehydrate the mixture, leaving Al-O-P and/or Si-O-P bonding linkages. When the slurry is prepared in this manner, complete reaction between the alumina and reactive phosphate ions does not take place until the calcination step, and hence the $P_2O_5/Al_2O_3$ mole-ratio may vary within reasonable limits, from an excess of $P_2O_5$ to an excess of $Al_2O_3$, preferably from about 0.01 to about 10.0. It is essential that excess P-OH and/or P-O-NH$_4$ groups be present during the calcining.

According to another preferred embodiment, the zeolite may be impregnated with an aqueous solution containing a phosphorus-oxide precursor such as phosphoric acid, ammonium phosphate, and/or mono- or dihydrogen ammonium phosphate. The resulting wet mixture, as in the preceding embodiment, is later dried, pelleted, and calcined to form the desired phosphate linkages between the zeolite crystals.

Alternatively, the desired phosphate binder may be separately preformed as a mixed, hydrogen- and/or ammonium phosphate of a weakly basic polyvalent metal cation having an ionic radius of less than 1.0 angstrom, which is thereafter mixed or slurried with the crystalline zeolite. Suitable metal cations include aluminum, magnesium, beryllium, and iron. One technique is to react alumina with phosphoric acid at elevated temperatures to form the various aluminum-hydrogen phosphates. The resulting acidic aluminum phosphates will be soluble or insoluble, depending upon the pH of the solution. Alternatively, the alumina may be reacted with mono- or dihydrogen ammonium phosphates, or other hydrogen-ammonium salts of the weakly basic polyvalent metals. When aluminum phosphates are separately prepared according to this procedure, the $P_2O_5/Al_2O_3$ mole-ratio may be between about 1.2 and about 10, and preferably between about 1.5 and about 6.5. Where the $P_2O_5/Al_2O_3$ ratio is 1.0 or less, relatively weak pellets are formed, due to the absence of P-OH and/or P-O-NH$_4$ groups during the calcining step.

It has also been discovered that the pH at which the binder is admixed with the zeolite affects the ultimate strength of the pellets. In general, it has been found that effective phosphate bonding is obtained under either acidic or basic conditions, from about pH 3.5 to 11. However, the strongest and most effective bonding is obtained by using low pH values, preferably between about 3.5 and 6.0.

It has also been discovered that hydrocracking activity of a crystalline, alumino-silicate, zeolite catalyst is not adversely affected by the acidic binders of this invention, though it is known that high acidity destroys the crystal structure of some of these zeolites.

Suitable alumina compounds for use herein include activated alumina, hydrated alumina (aluminum trihydrate), alumina hydrogel, silica-stabilized alumina containing e.g., about 5–15% by weight $SiO_2$; bauxite and other clays, etc.

Suitable phosphate bonding compounds include, but are not limited to, the acids of phosphorus such as orthophosphoric acid, metaphosphoric acid, and polyphosphoric acid; the ammonium salts of phosphoric acid such as ammonium phosphate, ammonium monohydrogen phosphate, ammonium dihydrogen phosphate, ammonium polyphosphates, ammonium acid polyphosphates; and the mixed hydrogen- and/or ammonium phosphates of weakly basic polyvalent metal cations having an ionic radius of less than 1.0 angstrom such as aluminum monohydrogen phosphate, aluminum dihydrogen phosphate, aluminum ammonium phosphates, acid aluminum polyphosphates, and similar phosphate salts of magnesium, beryllium and iron.

In any of the foregoing procedures, the zeolitic cation content of the molecular sieve component may be adjusted as desired either before or after admixture with the phosphate binder. Preferably, however, all base-exchange treatments are performed prior to admixture. It is further preferred, where zeolitic hydrogen ions are desired in the final composition, that the corresponding ammonium zeolite be initially mixed with the binder, and the desired hydrogen ions formed only on final calcining of the mixture.

Pelleting of the zeolite-binder mixtures may be carried out either by extruding the wet mixture through a suitable orifice, or by pressure-pelleting the partially dried powder in tableting dies. Both of these procedures are well known in the art. Final calcining of the pellets may be carried out by conventional procedures involving heating at e.g., about 700–1,400° F. for 1–48 hours, in air, steam, or inert gases.

Exemplary types of catalyst compositions contemplated herein include the following:

*Cracking catalysts.*—Mixtures of e.g., 50–97% by weight of X or Y molecular sieves (wherein the zeolitic cations are mainly hydrogen ions and/or polyvalent metal ions), and 3–50% by weight of an alumina-ammonium phosphate binder having a $P_2O_5/Al_2O_3$ mole-ratio between about 0.2 and 0.5.

*Hydrocracking catalysts.*—Mixtures of e.g., 50–97% by weight of a Y molecular sieve containing 0.2–2% by weight of palladium or platinum (and wherein the zeolitic cations are mainly hydrogen ions and/or polyvalent metal ions), and 3–50% by weight of an alumina-ammonium phosphate binder having a $P_2O_5/Al_2O_3$ mole ratio between about 0.2 and 0.5.

The foregoing catalysts, and many of a similar nature, are also useful in other hydrocarbon conversions such as paraffin isomerization, alkylation, reforming of naphthas, hydrogenation of olefins and aromatic hydrocarbons, desulfurization, denitrogenation, etc.

The hydrocracking catalysts of this invention may be employed for the hydrocracking of substantially any mineral oil fraction, particularly those boiling above the conventional gasoline range, i.e., above about 300° F., and usually above about 400° F., and having an end-boiling point up to about 1,000° F., but preferably not greater than about 850° F. Specific feed stocks contemplated comprise straight run gas oils and heavy naphthas, coker distillate gas oils and heavy naphthas, deasphalted crude oils, cycle oils derived from catalytic thermocracking operations and the like. These feedstocks may be derived from petroleum crude oils, shale oils, tar sand oils, coal hydrogenation products and the like. Specifically it is preferred to employ oils having an end-boiling-point between about 400° and 650° F., and API gravity between about 20° and 35°, and containing at least about 30% by volume of acid soluble components (aromatics plus olefins).

Hydrocracking conditions to be employed herein fall within the following ranges:

HYDROCRACKING CONDITIONS

|  | Operative | Preferred |
| --- | --- | --- |
| Temperature, °F | 400–1,000 | 450–850 |
| Pressure, p.s.i.g. | 500–5,000 | 750–2,500 |
| H₂/oil ratio, s.c.f./b | 1,000–15,000 | 2,000–10,000 |
| LHSV | 0.1–20 | 0.5–10 |

Those skilled in the art will understand that the combination of conditions selected should be correlated with the particular feedstock and catalyst used, to obtain the desired conversion per pass, normally between about 20% and 70% by volume of the feed. Ordinarily, about 500 to 3,000 s.c.f. of hydrogen per barrel of gasoline produced is consumed during the hydrocracking.

The following examples illustrate more specifically the preferred techniques of practicing this invention and the improvements obtained through the use of the novel phosphate-bonded zeolite pellet compositions when compared to pellets produced by prior art procedures, but are not to be construed as limiting the scope of the invention. A table of test results has been included at the end of Example V in order to provide ready comparison of results.

EXAMPLE I (A) An initial type Y molecular sieve hydrocracking catalyst was prepared in the normal manner from a sodium Y sieve zeolite having a silica-alumina mole-ratio of about 4.7. This procedure consisted in subjecting the sodium zeolite to ion-exchange with ammonium chloride solution to reduce the sodium content ($Na_2O$) to below 2% by weight. The resulting ammonium zeolite was then partially back-exchanged with an aqueous magnesium sulfate solution until the magnesium content (MgO) was about 5% by weight. The resulting ammonium-magnesium zeolite was then further ion-exchanged with an aqueous solution of tetrammine palladium chloride to add 0.5% of zeolitic palladium to the catalyst. The resulting ammonium-magnesium-palladium zeolite was then filtered off, drained, and dried at below 400° F. to a water content of about 16 to 20% by weight.

The partially dried catalyst powder was then reslurried in water at a pH of about 4.0, then dried at room temperature, granulated, dried at 100° C. and pressed into 3/16-inch by 3/16-inch pellets. The pelleted catalyst was then calcined in dry air for about 12 hours at 480° C. to activate the same and to convert the magnesium-ammonium zeolite to the corresponding magnesium-hydrogen zeolite. The resulting calcined pellets were found to have an average crushing strength of 12.8 pounds per pellet. (Crushing strengths are measured herein by placing an individual pellet in axially horizontal position on a flat plate and measuring the total force in pounds required to crush the same, the force being applied from above through a disk bearing on the top surface of the pellet. Crushing strengths reported herein are average values obtained from crushing several pellets.)

The calcined pellets prepared as above-described were twice subjected to the sequence of: immersion in dry kerosene, draining, wetting with water, and recalcining for about one hour at about 540° C. This treatment caused breakage of the pellets due to thermal stresses and expansion resulting in no pellets remaining.

(B) Another pelleted mixture was prepared in the same manner except that the pH during the reslurrying step was adjusted to 10.0 by the addition of ammonia. The calcined pellets were found to have a crushing strength of about 11.6 pounds per pellet. After twice immersing in kerosene, wetting with water and recalcining at about 540° C., about 8 percent of the pellets remained as whole pellets. Thus, control of pH prior to pelleting offers no solution to the problem of inadequate pellet stability.

EXAMPLE II (A) The initial crystalline zeolite was prepared according to the procedure set out in Example I, however a binder of silica-stabilized alumina was added during the reslurrying step, as follows: about 40 grams of the ammonium-magnesium-palladium zeolite was slurried with 8.6 grams of silica-stabilized alumina (5 wt. percent $SiO_2$) in 30 milliliters of water at a pH of 4.0. The pH of the slurry after mixing was 5.7. The slurried mixture was mulled to obtain uniform dispersion, dried at room temperature, granulated, dried at 100° C., reground, and pressed into 3/16-inch by 3/16-inch pellets. The pellets were calcined as before for 12 hours at 480° C., and were then found to have an average crushing strength of about 5.2 pounds per pellet. The pellets were then twice immersed in dry kerosene, drained, wetted with water and recalcined for one hour at a less severe temperature of 480° C., were found to have a crushing strength of 2.0 pounds per pellet.

(B) Another pelleted mixture was prepared in the same manner except that the pH during the reslurrying step was adjusted to 10.0 by the addition of ammonia. The pH of the slurry after mixing was 9.6. In this instance the calcined pellets were found to have a crushing strength of about 11.9 pounds per pellet. After the pellets were twice immersed in dry kerosene, wetted with water and recalcined as in (A) above, they were found to have a crushing strength of about 3.3 pounds per pellet.

Although these pellets were considerably more stable than those of the previous example, in which no binder was used, they are still too fragile for satisfactory commercial use.

The following examples illustrate the preferred techniques for the preparation of phosphate-bonded pellets in accordance with the practice of this invention and results obtainable therefrom.

EXAMPLE III (A) In this example the initial ammonium-magnesium-palladium zeolite was prepared according to the procedures in Example 1, but an ammonium phosphate binder was added thereto as follows: about 40 grams of the zeolite was slurried in 30 milliliters of water, and to this slurry was added 30 milliliters of 12% ammonium monohydrogen phosphate. The pH of the slurry after mixing was 4.4. In this instance the binder comprises 6.3% by weight of the mixture. Pellets were formed from the slurry as in the preceding examples, and were then calcined as before for 12 hours at 480° C. The resulting pellets were found to have an average crushing strength of 21.9 pounds per pellet. After twice immersing in dry kerosene, draining, wetting with water and recalcining for one hour at 540° C., the pellets were found to have a crushing strength of 10.1 pounds per pellet.

(B) Another pelleted mixture was prepared in the same manner except that the pH of the final aqueous slurry after mixing was adjusted to about 10.3 by the addition of ammonia. In this instance the pellets were found to have a crushing strength of about 10.7 pounds per pellet. The pellets were twice immersed in dry kerosene, drained, wetted with water and recalcined at 540° C., and were then found to have a crushing strength of about 4.3 pounds per pellet.

EXAMPLE IV (A) In this example the initial ammonium-magnesium-palladium zeolite was prepared according to procedures in Example 1, but an alumina-phosphate binder was added thereto as follows: about 40 grams of the zeolite was slurried in 30 milliliters of water, and to this slurry was added a second slurry of 6.0 grams of silica-stabilized alumina (5% $SiO_2$) in 30 milliliters of 12%

$$(NH_4)_2HPO_4$$

The resulting $P_2O_5/Al_2O_3$ mole-ratio was about 0.35 and the pH of the mixture was 4.4. In this instance binder comprised 20% by weight of the mixture. Pellets were formed from the slurry as in the preceding examples, and were then calcined as before for 12 hours at 480° C. The resulting pellets were found to have an average crushing strength of 28.4 pounds per pellet. The pellets were then twice immersed in dry kerosene, drained, wetted with water and recalcined for one hour at 540° C. and were then found to have a crush strength of 13.2 pounds per pellet.

(B) Another pelleted mixture was prepared in the same manner except that the pH of the final aqueous slurry was adjusted to about 10.3 by the addition of ammonia. The resulting pellets were found to have a crushing strength of about 21.1 pounds per pellet. The pellets were twice immersed in dry kerosene, drained, wetted with water, and recalcined at 540° C., and were then found to have a crushing strength of 8.1 pounds per pellet.

EXAMPLE V (A) In this example the initial ammonium-magnesium-palladium zeolite was prepared according to procedures in Example 1, but an alumina-phosphate binder was thereto as follows: about 40 grams of the zeolite was slurried in 30 milliliters of water, and to this slurry was added a partially neutralized solution of alumina dissolved in phosphoric acid. The resulting $P_2O_5/Al_2O_3$ ratio was about 3.1, and the pH of the slurry after mixing was 4.7. In this instance, the binder comprised 10% by weight of the mixture. Pellets were formed from this slurry as in the preceding examples, and were then calcined as before for 12 hours at 480° C. The resulting pellets were found to have an average crushing strength of 7.3 pounds per pellet. The pellets were then twice immersed in dry kerosene, drained, wetted with water, and recalcined for one hour at 540° C. No fragmentation occurred. The crushing strength of the pellets were then found to be 8.5 pounds per pellet.

(B) Another pelleted mixture was prepared in the same manner except that the $P_2O_5/Al_2O_3$ mole-ratio was changed to 1.5, thus corresponding to the formula $$Al_2(HPO_4)_3$$

The pH of the slurry was maintained at 4.7. The resulting pellets were found to have a crushing strength of about 14.5 pounds per pellet. The pellets were twice immersed in dry kerosene, dried, wetted with water and recalcined at 540° C. Twenty-four percent (24%) frag-

TABLE

| Pelleted Mixture | Added Binder | pH After Mixing | $P_2O_5/Al_2O_3$ Mole-Ratio | Average Crushing Strength | | | Percent Whole Pellets Remaining After Stability Test |
|---|---|---|---|---|---|---|---|
| | | | | Uncalcined | Calcined [1] | After Stability Test [2] | |
| Example I: | | | | | | | |
| A | None | 4.0 | | 4.8 | 12.2 | None | None |
| B | do | 10.0 | | 7.2 | 11.6 | | 8 |
| Example II: | | | | | | | |
| A | 19% $Al_2O_3$ / 1% $SiO_2$ | 5.7 | | 3.4 | 5.2 | [3] 2.0 | [3] 84 |
| B | 19% $Al_2O_3$ / 1% $SiO_2$ | 9.6 | | 3.7 | 11.9 | [3] 3.3 | [3] 96 |
| Example III: | | | | | | | |
| A | 6.3% $P_2O_5$ | 4.4 | | 14.8 | 21.9 | 10.1 | 100 |
| B | 6.3% $P_2O_5$ | 10.3 | | 3.6 | 10.7 | 4.3 | 96 |
| Example IV: | | | | | | | |
| A | 6.3% $P_2O_5$ / 13.0% $Al_2O_3$ / 0.7% $SiO_2$ | 4.4 | 0.35 | 14.3 | 28.2 | 13.2 | 100 |
| B | 6.3% $P_2O_5$ / 13.0% $Al_2O_3$ / 0.7% $SiO_2$ | 10.3 | 0.35 | 8.2 | 21.1 | 8.1 | 100 |
| Example V: | | | | | | | |
| A | 8.1% $P_2O_5$ / 1.9% $Al_2O_3$ | 4.7 | 3.1 | 5.9 | 7.3 | 8.5 | 100 |
| B | 6.8% $P_2O_5$ / 3.8% $Al_2O_3$ | 4.7 | 1.5 | 5.5 | 14.5 | 11.4 | 76 |
| C | 5.8% $P_2O_5$ / 4.1% $Al_2O_3$ | 4.9 | 1.0 | 5.4 | 7.6 | | 40 |

[1] Calcined for 12 hours at 480° C.
[2] The stability test was conducted by immersing the pellets twice in dry kerosene, draining, wetting with water, and calcining for 2 hours at 540° C., after which the crushing strength was determined on remaining whole pellets.
[3] The stability recalcination was conducted at less severe conditions using 480° C.

mentation occurred after which the remaining whole pellets were found to have a crushing strength of about 11.5 pounds per pellet.

(C) Another pelleted mixture was prepared in the same manner except that the $P_2O_5/Al_2O_3$ mole-ratio was changed to 1.0. The pH was maintained at 4.9. The resulting pellets were found to have a crushing strength of about 7.6 pounds per pellet. The pellets were twice immersed in dry kerosene, drained, wetted with water and recalcined at 540° C. Sixty percent (60%) fragmentation occurred, thus indicating that neutral aluminum phosphate is substantially ineffective as a binder.

The preceding table illustrates the effect of the various binders on the strength of the magnesium-hydrogen zeolite pellets.

It will be observed that the addition of the phosphate binder effected a substantial improvement in the crushing strength in all cases, and particularly where both alumina and phosphate ions are added. Moreover, this crushing strength is not deteriorated substantially after treatment in the kerosene and water followed by recalcination. It is therefore evident that the addition of the phosphate ion not only greatly increased the initial crushing strength, but also effected a substantial stabilization of the catalyst against influences which caused great weakening in the phosphate-free catalysts.

EXAMPLE VI

This example compares the hydrocracking activity of a phosphorus oxide bonded hydrogen Y molecular sieve with a conventional pelleted catalyst containing no binder. The feedstock employed was an 845° F. end-point gas oil having an API gravity of 34.9, containing about 0.001% nitrogen and about 0.1% sulfur. The conventional pelleted catalyst was prepared by pelleting a slurry of catalyst containing 0.5% palladium deposited on a magnesium-hydrogen Y molecular sieve without a binder and at a pH of about 4.0. The phosphate bonded catalyst was prepared in accordance with Example III(A) using the identical hydrogen zeolite catalyst and an ammonium phosphate binder corresponding to 6.3% $P_2O_5$. The hydrocracking conditions were:

| | |
|---|---|
| Temperature °F | 600–700 |
| Pressure p.s.i.g | 1,000 |
| LHSV | 4.0 |
| H₂/feed s.c.f./b | 12,000 |

The results were as follows:

CATALYST PELLETS

| | 0.5% Pd on Mg-H-Y Sieve | | | |
|---|---|---|---|---|
| Hours on Stream | (No binder) | | (6.3% P₂O₅ binder) | |
| | Temp., °F. | Product Gravity, API° | Temp., °F. | Product Gravity, API° |
| 33 | 654 | 51.0 | 672 | 52.8 |
| 36 | 657 | 50.6 | 673 | 51.8 |
| 39 | 659 | 49.2 | 674 | 54.3 |
| 42 | 664 | 51.2 | 674 | 53.4 |
| 45 | 664 | 52.4 | 674 | 52.9 |
| 48 | 667 | 51.7 | 674 | 51.4 |

| Yields from 33–48 hour run | Volume-Percent Yield | Volume-Percent Yield |
|---|---|---|
| C₄ | 4.7 | 2.4 |
| C₅ | 8.3 | 7.0 |
| 120°–360° F | 28.5 | 28.6 |
| 360°–500° F | 16.6 | 15.0 |

It will be apparent that the acidity of the phosphorus-oxide binder does not substantially affect the hydrocracking activity of the hydrogen zeolite. The conversion of feedstock to desired products for a period of 15 hours at similar temperatures is shown to be substantially the same.

Other catalysts and adsorbents of this invention exhibit a substantially similar improvement in stability and crushing strength. It is therefore not intended that the invention should be limited to details described above since many variations may be made by those skilled in the art without departing from the scope or spirit of the following claims.

I claim:

1. A mechanically stable, adsorbent composition comprising a phosphate-bonded pellet of crystalline, aluminosilicate zeolite, said zeolite having a $SiO_2/Al_2O_3$ mole-ratio between about 3 and 12, and wherein the phosphate bond is produced by calcining an acidic co-pelleted mixture of said zeolite and a phosphorus oxide precursor selected from the group consisting of phosphoric acid, ammonium salts of phosphoric acid, and mixed hydrogen and/or ammonium phosphates of weakly basic polyvalent metal cations having an ionic radius of less than about 1.0 angstrom, sufficient of said phosphorus oxide precursor being employed to yield a final composition containing 1–50% by weight of phosphate calculated as $P_2O_5$.

2. A pelleted composition as defined in claim 1 wherein said polyvalent metal is selected from the group consisting of aluminum, magnesium, beryllium, and iron.

3. A mechanically stable adsorbent composition comprising a co-pelleted and calcined acidic mixture of:
    (A) a crystalline, alumino-silicate zeolite having a $SiO_2/Al_2O_3$ mole-ratio between about 3 and 12; and
    (B) a binder comprising an acidic admixture of alumina and a phosphorus oxide precursor selected from the group consisting of phosphoric acid, ammonium salts of phosphoric acid, and mixed hydrogen and/or ammonium phosphates of weakly basic polyvalent metal cations having an ionic radius of less than 1.0 angstrom, sufficient of said phosphorus oxide precursor being employed to yield a final composition containing 1–50% by weight of phosphate calculated as $P_2O_5$.

4. A mechanically stable, pelleted, catalyst composition as defined in claim 3 wherein said alumina is present in such proportions that the $P_2O_5/Al_2O_3$ mole-ratio is between about 0.01 and about 10.0.

5. A pelleted composition as defined in claim 3 wherein said polyvalent metal is selected from the group consisting of aluminum, magnesium, beryllium, and iron.

6. A mechanically stable adsorbent composition comprising calcined pellets of an acidic mixture of:
    (A) a crystalline, alumino-silicate zeolite having a $SiO_2/Al_2O_3$ mole-ratio between about 3 and 12 and which is also at least about 20 percent deficient in zeolitic metal cations; and
    (B) sufficient of a binder comprising an oxide of phosphorus to give a final composition containing 1–50% by weight of phosphate, calculated as $P_2O_5$.

7. A pelleted mixture as defined in claim 5 wherein said binder includes alumina in such proportions that the $P_2O_5/Al_2O_3$ mole-ratio is between about 0.01 and about 10.0.

8. A mechanically stable, pelleted, catalyst composition as defined in claim 5 wherein said zeolite is promoted with a Group VIII metal hydrogenating component.

9. A mechanically stable, pelleted, catalyst composition as defined in claim 5 wherein the crystalline zeolite is of the Y crystal type.

10. A pelleted mixture as defined in claim 5 wherein said binder comprises from about 3% to about 40% by weight of the pelleted mixture.

11. A process for the preparation of mechanically stable, phosphate-bonded, catalyst pellets which comprises:

(A) forming an acidic admixture comprising a crystalline alumino-silicate, zeolite having a $SiO_2/Al_2O_3$ mole-ratio between about 3.0 and 12 and which is at least about 20 percent deficient in zeolitic metal cations, and a phosphorus oxide precursor selected from the group consisting of phosphoric acid, ammonium salts of phosphoric acid, and mixed hydrogen and/or ammonium phosphates of weakly basic polyvalent metal cations having an ionic radius of less than 1.0 angstrom, sufficient of said phosphorus oxide precursor being employed to yield a final composition containing 1–50% by weight of phosphate calculated as $P_2O_5$;

(B) forming pellets from said admixture; and (C) calcining said pellets.

12. A process as defined in claim 11 wherein alumina is also added in step (A) in such proportions that the mole-ratio of $P_2O_5/Al_2O_3$ is between about 0.01 and about 10.

13. A process as defined in claim 11 wherein said phosphorus oxide precursor is acidic aluminum phosphate wherein the mole-ratio of $P_2O_5/Al_2O_3$ is greater than about 1.2.

14. A process as defined in claim 11 wherein the mole-ratio of $P_2O_5/Al_2O_3$ is between about 1.3 and 10.0.

15. A process for the preparation of mechanically stable, phosphate-bonded, catalyst pellets which comprises:

(A) forming an acidic mixture of a crystalline, alumino-silicate zeolite having a $SiO_2/Al_2O_3$ mole-ratio between about 3.0 and 12 and which is at least about 20 percent deficient in zeolite metal cations, with an unreacted acidic mixture of alumina and a phosphorus-oxide precursor selected from the group consisting of phosphoric acid, ammonium salts of phosphoric acid, and mixed hydrogen and/or ammonium phosphates of weakly basic polyvalent metal cations having an ionic radius of less than 1.0 angstrom, sufficient of said phosphorus oxide precursor being employed to yield a final composition containing 1–50% by weight of phosphate calculated as $P_2O_5$;

(B) forming pellets from the mixture; and (C) calcining said pellets to decompose ammonium ions present in said mixture and effect activation of said catalyst.

References Cited

UNITED STATES PATENTS

| | | | |
|---|---|---|---|
| 2,270,044 | 1/1942 | Fulton et al. | 208—114 |
| 3,140,251 | 7/1964 | Plank et al. | 208—120 |
| 3,143,491 | 8/1964 | Bergstrom | 208—120 |
| 3,236,762 | 2/1966 | Rabo et al. | 208—111 |

DELBERT E. GANTZ, *Primary Examiner.*

ABRAHAM RIMENS, *Examiner.*